H. H. CLARK.
NUT LOCK.
APPLICATION FILED NOV. 11, 1920.

1,412,387.

Patented Apr. 11, 1922.

INVENTOR
HAROLD H. CLARK
BY
Hazard & Miller
ATT'YS.

UNITED STATES PATENT OFFICE.

HAROLD H. CLARK, OF SAN BERNARDINO, CALIFORNIA, ASSIGNOR OF ONE-FOURTH TO W. H. SWAN, ONE-FOURTH TO C. B. VAN DEVENTER, AND ONE-FOURTH TO E. E. TYLER, OF SAN BERNARDINO, CALIFORNIA.

NUT LOCK.

1,412,387. Specification of Letters Patent. Patented Apr. 11, 1922.

Application filed November 11, 1920. Serial No. 423,362.

*To all whom it may concern:*

Be it known that I, HAROLD H. CLARK, a citizen of the United States, residing at San Bernardino, in the county of San Bernardino and State of California, have invented new and useful Improvements in Nut Locks, of which the following is a specification.

It is the object of this invention to provide a nut lock of extremely simple construction, wherein the nut is pinched upon its bolt so as to provide a frictional clamping lock between the bolt and nut without necessitating the employment of additional members other than the nut itself in order to form the lock.

The invention will be readily understood from the following description of the accompanying drawings, in which.

Figure 1:
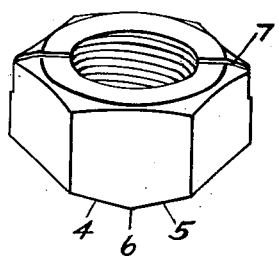
Figure 1 is a perspective view of a nut constructed in accordance with the invention.
Figure 2:
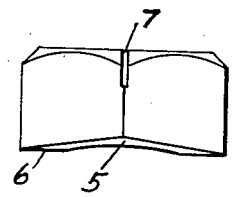
Fig. 2 is a side elevation of the same.
Figure 3:
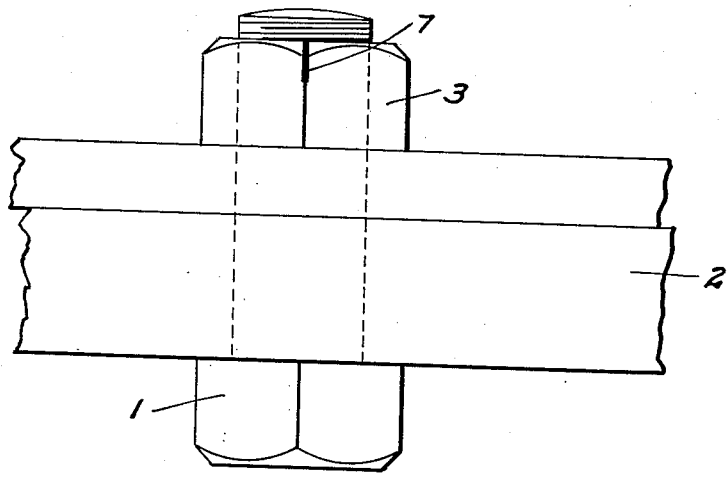
Fig. 3 is a side elevation showing the nut applied to a bolt and screwed down upon the bolt into locking position.

In the drawings I have illustrated the improved nut lock as employed in connection with a bolt 1 extending through a member 2, and having the nut 3 threaded upon the same.

The under surface of nut 3 includes two plane surfaces 4 and 5 inclined downwardly with relation to one another from diametrically opposite edges of the nut to a transverse line 6, extending across the nut between the diametrically opposed edges. By this arrangement the under surface of the nut forms a ridge at the line 6 extending across the nut through its center, and plane surfaces inclined upwardly from opposite sides of this ridge to the opposite edges of the nut.

The upper surface of the nut is diametrically slotted as shown at 7 at opposite sides of the threaded bore of the nut. It will be noted that the slot 7 is arranged at an angle of ninety degrees to the line 6 forming the ridge across the under side of the nut.

In operation with the bolt 1 in position, the nut 3 is threaded upon the same until ridge 6 engages a member 2 through which the bolt extends. In this position tapering spaces are left between the inclined surfaces 4 and 5, and the member 2. Pressure is then applied to the nut to continue the rotation of the same, and as the nut is threaded down further upon the bolt, the inclined surfaces 4 and 5 will be forced toward the surface of member 2, and as a consequence there will be a tendency to axially bend the nut along the line of ridge 6. This outward bending of the respective sides of the nut will tend to pinch the metal forming the nut at the slot 7 so as to close said slot. The closing of the slot will in turn pinch the threaded bore of the nut upon the bolt, and as a result a frictional clamping lock is provided between the bolt and the nut.

Thus it will be seen that I have provided a construction wherein a nut lock is formed without changing the usual construction of the bolt to which the nut is applied, and without adding any members to the usual construction of the nut. As a consequence, the nut lock may be readily formed, and provides a relatively cheap article of manufacture.

Various changes may be made without departing from the spirit of the invention as claimed.

What is claimed is:

The combination with a bolt of a nut threaded upon the same, said nut having a slot extending diametrically across the upper surface and through the corners of the nut, and a lower surface comprising inclined planes sloping toward opposite edges of the nut away from a central ridge extending across said nut, said ridge being arranged at right angles to said slot so that tightening of the nut will axially bend the same to close said slot and cause clamping engagement upon said bolt.

In testimony whereof I have signed my name to this specification.

HAROLD H. CLARK.